(12) United States Patent
Chase et al.

(10) Patent No.: US 8,055,477 B2
(45) Date of Patent: Nov. 8, 2011

(54) IDENTIFYING DETERMINISTIC PERFORMANCE BOOST CAPABILITY OF A COMPUTER SYSTEM

(75) Inventors: Harold W. Chase, Cedar Park, TX (US); Soraya Ghiasi, Boulder, CO (US); Michael Stephen Floyd, Cedar Park, TX (US); Joshua David Friedrich, Austin, TX (US); Steven Paul Hartman, Round Rock, TX (US); Norman Karl James, Liberty Hill, TX (US); Malcolm Scott Ware, Austin, TX (US); Richard L. Willaman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 12/274,534

(22) Filed: Nov. 20, 2008

(65) Prior Publication Data
US 2010/0125436 A1    May 20, 2010

(51) Int. Cl.
*G06F 15/00* (2006.01)
(52) U.S. Cl. .................. 702/186; 702/182; 713/300
(58) Field of Classification Search .............. 702/80, 702/130, 176, 182, 186, 190; 345/213, 519; 713/300, 310, 320, 321, 322; 714/38.1, 47.1, 714/47.2
See application file for complete search history.

(56) References Cited

U.S. PATENT DOCUMENTS

| | | | |
|---|---|---|---|
| 5,557,548 A | 9/1996 | Gover et al. | |
| 5,657,253 A | 8/1997 | Dreyer et al. | |
| 5,719,800 A | 2/1998 | Mittal et al. | 384/707 |
| 5,796,637 A | 8/1998 | Glew et al. | |
| 5,832,284 A | 11/1998 | Michail et al. | |
| 5,974,557 A | 10/1999 | Thomas et al. | |
| 6,112,318 A | 8/2000 | Jouppi et al. | |
| 6,233,531 B1 | 5/2001 | Klassen et al. | |
| 6,275,782 B1 | 8/2001 | Mann | |
| 6,546,359 B1 | 4/2003 | Week | |
| 6,678,777 B2 | 1/2004 | Rao et al. | |
| 6,731,292 B2* | 5/2004 | Burk et al. | 345/519 |
| 6,792,392 B1 | 9/2004 | Knight | |
| 6,836,849 B2 | 12/2004 | Brock et al. | |
| 7,047,471 B2 | 5/2006 | Monfared et al. | 714/745 |
| 7,051,221 B2 | 5/2006 | Clabes et al. | |
| 7,194,545 B2 | 3/2007 | Urien | |

(Continued)

OTHER PUBLICATIONS

PCT Search Report for Application No. PCT/EP2009/064979, mailed Mar. 25, 2010, 13 pages.

(Continued)

*Primary Examiner* — John H Le
(74) *Attorney, Agent, or Firm* — VanLeeuwen & VanLeeuwen; Diana R. Gerhardt

(57) ABSTRACT

A benchmark tester retrieves a voltage margin that corresponds to a device that a system includes. The voltage margin indicates an additional amount of voltage to apply to a nominal voltage that, when added, results in the device operating at a power limit while executing a worst-case power workload. Next, the benchmark tester (or thermal power management device) sets an input voltage for the device to a value equal to the sum of the voltage margin and the nominal voltage. The benchmark tester then dynamically benchmark tests the system, which includes adjusting the device's frequency and input voltage while ensuring that the device does not exceed the device's power limit. In turn, the benchmark tester records a guaranteed minimum performance boost for the system based upon a result of the benchmark testing.

21 Claims, 8 Drawing Sheets

U.S. PATENT DOCUMENTS

| | | |
|---|---|---|
| 7,197,419 B2 | 3/2007 | Floyd et al. |
| 7,340,378 B1 | 3/2008 | Floyd et al. |
| 7,382,366 B1 | 6/2008 | Klock et al. |
| 7,475,175 B2 | 1/2009 | Klein et al. |
| 7,533,003 B2 | 5/2009 | Floyd et al. |
| 7,576,569 B2 | 8/2009 | Carpenter et al. |
| 7,681,054 B2 | 3/2010 | Ghiasi et al. |
| 7,908,493 B2 | 3/2011 | Bieswanger et al. ......... 713/300 |
| 2002/0073255 A1 | 6/2002 | Davidson et al. |
| 2004/0216113 A1 | 10/2004 | Armstrong et al. |
| 2004/0236993 A1 | 11/2004 | Adkisson et al. |
| 2004/0237003 A1 | 11/2004 | Adkisson et al. |
| 2005/0021292 A1 | 1/2005 | Vock et al. |
| 2005/0081101 A1 | 4/2005 | Love et al. |
| 2005/0102539 A1 | 5/2005 | Hepner et al. |
| 2005/0108591 A1 | 5/2005 | Mendelson et al. .......... 713/500 |
| 2005/0155021 A1 | 7/2005 | DeWitt et al. |
| 2005/0177344 A1 | 8/2005 | Khaleel |
| 2005/0183065 A1 | 8/2005 | Wolczko et al. |
| 2005/0283677 A1 | 12/2005 | Adkisson et al. |
| 2006/0031691 A1 | 2/2006 | Bacchus et al. |
| 2006/0179359 A1 | 8/2006 | Floyd et al. |
| 2007/0001715 A1 | 1/2007 | Brown et al. |
| 2007/0033425 A1 | 2/2007 | Clark ............................ 713/320 |
| 2007/0052453 A1 | 3/2007 | Wald |
| 2007/0266263 A1 | 11/2007 | Lee et al. ....................... 713/300 |
| 2007/0285080 A1 | 12/2007 | Abuhamdeh et al. |
| 2008/0065912 A1 | 3/2008 | Bodner et al. ................ 713/300 |
| 2008/0086395 A1 | 4/2008 | Brenner et al. |
| 2008/0091962 A1 | 4/2008 | Cepulis et al. |
| 2008/0281476 A1 | 11/2008 | Bose et al. .................... 700/300 |
| 2008/0307238 A1 | 12/2008 | Bieswanger et al. |
| 2009/0187777 A1 | 7/2009 | Clark ............................ 713/320 |

OTHER PUBLICATIONS

Zhu et al., "Localized Microarchitecture-Level Voltage Management," 2006 IEEE International Symposium on Circuits and Systems, May 21-24, 2006, pp. 37-40, XP0109383345, ISBN 978-0-7803-9389-9.

Office Action for U.S. Appl. No. 11/758,798, mailed Feb. 3, 2010, 26 pages.

May, John M., "MPX: Software for Multiplexing Hardware Performance Counters", IPDPS Proceedings 2001.

Notice of allowance for U.S. Appl. No. 11/951,310, mailed Jan. 5, 2009, 28 pages.

Ghiasi, et al., "Scheduling for Heterogeneous Processors in Server Systems", Conf. on Computing Frontiers, pp. 199-210, May 2005.

Kotla, et al., "Scheduling Processor Voltage and Frequency in Server and Cluster Systems", IPDPS 19$^{th}$ Symposium, Apr. 2005.

Kotla, et al., "Characterizing the Impact of Different Memory Intensity Levels", 7$^{th}$ Annual Workshop on Workload Characterization, Oct. 25, 2004.

Office Action for U.S. Appl. No. 11/565,106 mailed Jul. 13, 2007, 20 pages.

Notice of Allowance for U.S. Appl. No. 11/565,106, mailed Sep. 12, 2007, 8 pages.

Notice of Allowance for U.S. Appl. No. 11/758,798, mailed Nov. 10, 2010, 15 pages.

Final Office Action for U.S. Appl. No. 11/758,798, mailed Jun. 2, 2010, 15 pages.

\* cited by examiner

IDENTIFYING DETERMINISTIC PERFORMANCE BOOST CAPABILITY OF A COMPUTER SYSTEM

BACKGROUND OF THE INVENTION

1. Technical Field

The present invention relates to identifying deterministic performance boost capability of a computer system. More particularly, the present invention relates to acquiring device voltage margins and utilizing the device voltage margins during benchmark testing in order to identify a system's guaranteed minimum performance boost.

2. Description of the Related Art

Manufacturers typically guarantee a computer system's performance characteristics based upon certain criteria, such as an amount of time that a computer system requires in order to execute a benchmark test. These manufacturers may also disclose a non-guaranteed performance increase over the computer system's guaranteed characteristics.

SUMMARY

A benchmark tester retrieves a voltage margin that corresponds to a device included in a system. The voltage margin indicates an additional amount of voltage to apply to a nominal voltage that results in the device operating at a power limit while executing a worst-case power workload. Next, the benchmark tester (or thermal power management device) sets an input voltage for the device to a value equal to the sum of the voltage margin and the nominal voltage. The benchmark tester then dynamically benchmark tests the system, which includes adjusting the device's frequency and input voltage while ensuring that the device does not exceed the device's power limit. In turn, the benchmark tester records a guaranteed minimum performance boost for the system based upon a result of the benchmark testing.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

Figure 1:
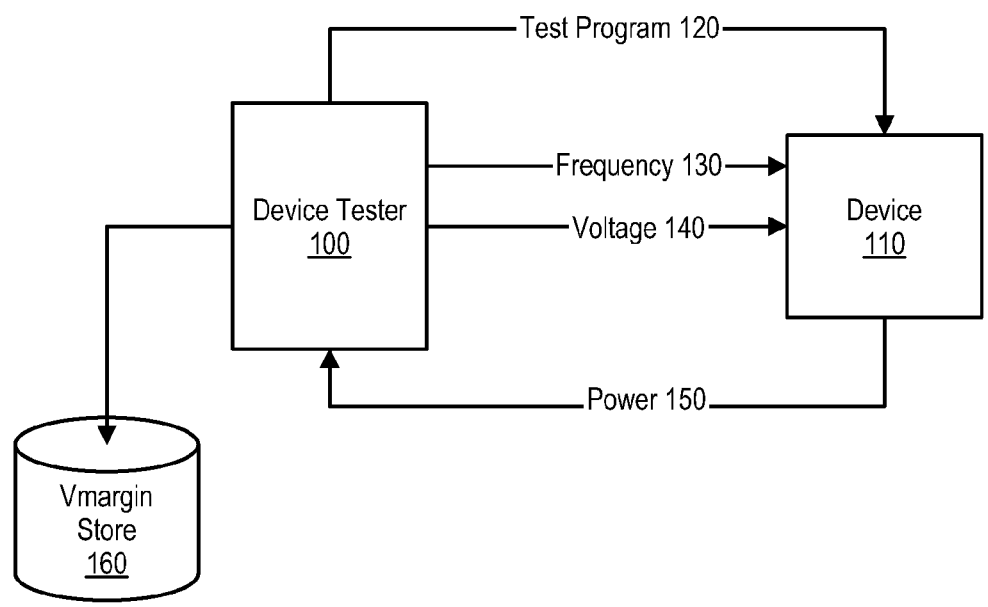
FIG. 1 is a diagram showing a device tester that computes a device's voltage margin during manufacturing test.

FIG. 1 is a diagram showing a device tester that computes a device's voltage margin during manufacturing test. As discussed herein, a voltage margin is a voltage to apply to the device's nominal voltage that results in the device operating at the device's power limit while executing a worse-case power workload at a nominal frequency (see FIG. 6 and corresponding text for further details).

Device tester 100 provides test program 120, frequency 130 (e.g., clock signal), and voltage 140 to device 110. Test program 120 is a program that tests device 110 in various ways, such as testing race conditions and stressing various portions of device 110. Frequency 130 and voltage 140 are a system clock and supply voltage, respectively, that device tester 100 adjusts during manufacturing test.

In order to identify device 110's minimum operational voltage, device tester 100 supplies frequency 130 at a rate equal to the nominal frequency plus a frequency guard band (e.g., 8%), and provides test program 120, which exercises device 110's worst case timing paths. Device tester 100 decreases voltage 140 until device 110 fails at one of the timing path tests. At this point, voltage 140 is at its minimum operating voltage, which device tester 100 logs. As one skilled in the art can appreciate, the minimum operational voltage may be set by technology, reliability requirements, circuit failure, and/or other criteria.

In order to identify device 110's maximum voltage, device tester 100 supplies frequency 130 at a rate equal to the nominal frequency and provides test program 120, which executes on device 110 at a worst-case power workload. Next, device tester 100 increases voltage 140 until device tester 100 detects that power 150 reaches device 110's rated power limit, which is a parameter that device 110's thermal design specification specifies. At this point, voltage 140 is at its maximum voltage, which device tester 100 logs.

Figure 6:
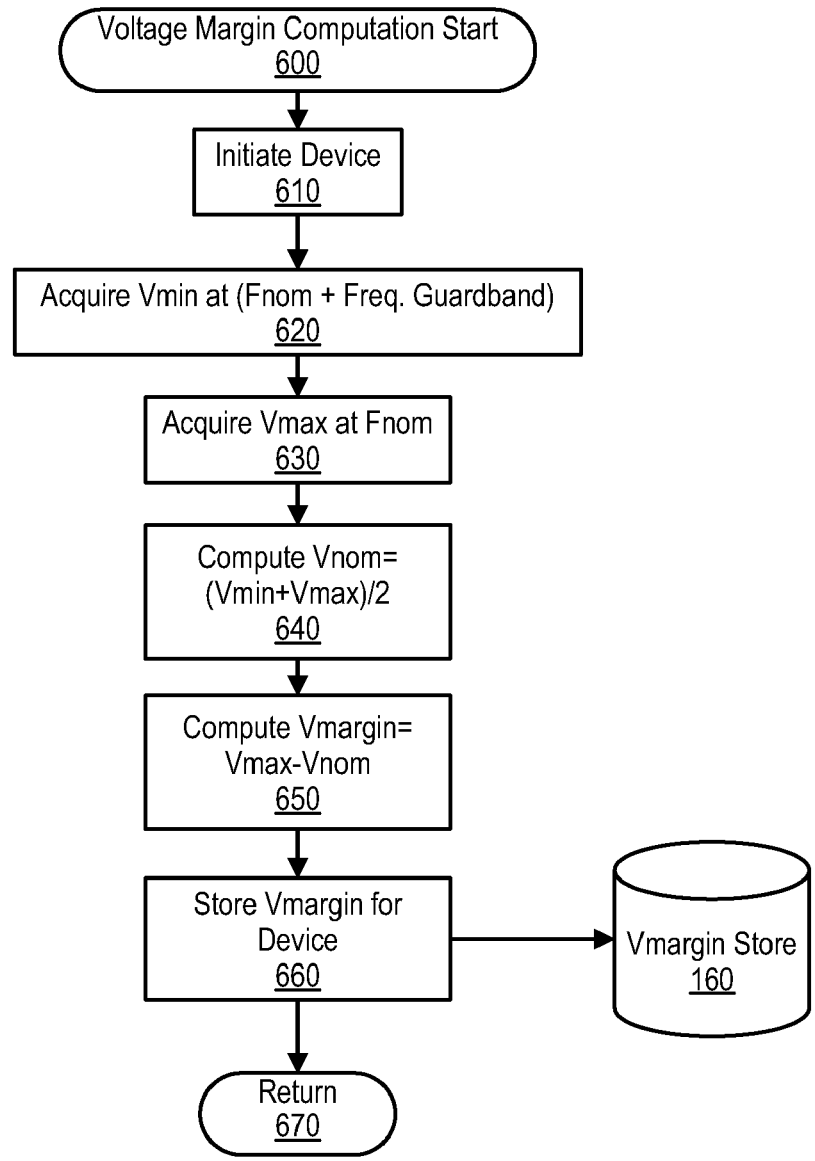
FIG. 6 is a flowchart showing steps taken in an embodiment for computing a voltage margin for a device.

Device tester 100 uses the minimum voltage and the maximum voltage to compute a voltage margin for device 110 (see FIG. 6 and corresponding text for further details). As one skilled in the art can appreciate, a user may utilize other approaches to compute device 110's voltage margin, such as an approach shown in FIG. 8.

Once device tester 100 computes and records device 110's voltage margin, a benchmark tester tests a computer system that includes device 100 in order to identify a guaranteed minimum performance boost for the computer system. As one skilled in the art can appreciate, the computer system may include multiple devices and/or a thermal power management device (TPMD) (see FIGS. 2, 5, 7, and corresponding text for further details).

Figure 2:
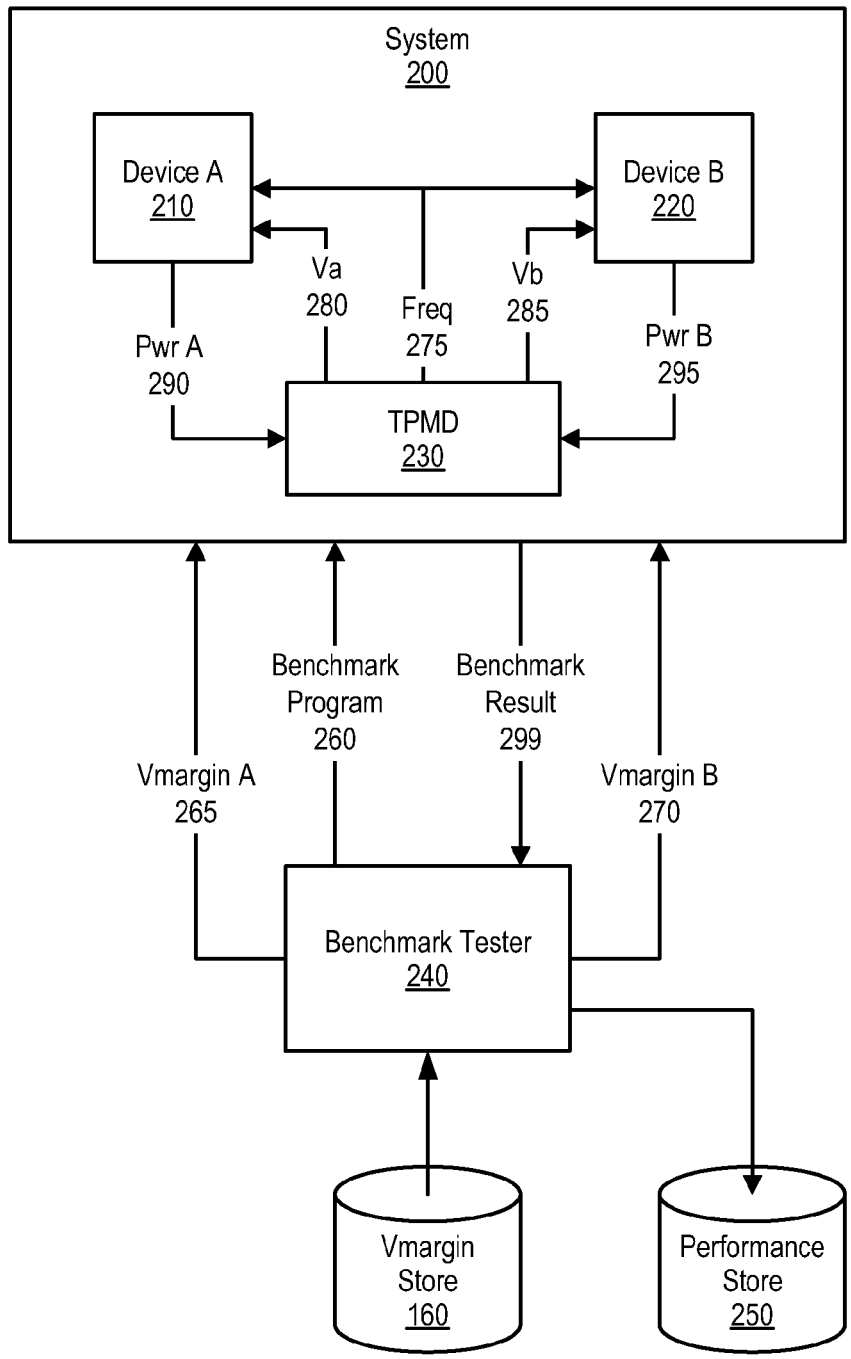
FIG. 2 is a diagram showing a benchmark tester testing a system in order to identify the system's guaranteed minimum performance boost capability.

FIG. 2 is a diagram showing a benchmark tester testing a system in order to identify the system's guaranteed minimum performance boost capability. System 200 includes device A 210, device B 220, and thermal power management device (TPMD) 230. TPMD 230 controls voltage and frequency supplies to device A 210 and device B 220. In addition, TPMD 230 monitors each device's power dissipation via power A 290 and power B 295. Voltage margin store 160 includes device A 210's and device B 220's previously computed voltage margins (see FIG. 1 and corresponding text for further details).

Benchmark tester 240 is an information handling system, which includes one or more processors and computer memory, that is capable of performing the computing operations described herein. Benchmark tester 240 begins by initializing system 200 and providing benchmark program 260, voltage margin A 265, and voltage margin B 270 to system 200. System 200 loads benchmark program 260 onto device A 210 and device B 220, which tests the devices under various benchmark conditions. TPMD 230 adds voltage margin A 265 and voltage margin B 270 to device A 210's and device B 220's nominal voltage, respectively. As such, TPMD 230 provides input voltage 280 to device A 210 at a value that is the sum of voltage margin A 265 and device A 210's nominal voltage. In turn, TPMD 230 provides input voltage 285 to device B 220 at a value that is the sum of voltage margin B 270 and device B 220's nominal voltage. As one skilled in the art can appreciate, voltage 280 and 285 may be different voltage levels.

During benchmark testing, TPMD 230 dynamically adjusts frequency 275, input voltage 280, and input voltage 285 while monitoring power A 290 and power B 295 in order to ensure that neither device exceeds its power limit. Once benchmark testing completes, TPMD 230 provides benchmark result 299 to benchmark tester 240. For example, benchmark result 299 may be in terms of the amount of required time to complete the benchmark test (benchmark completion time), a number of transactions per second, or some other metric. Benchmark tester 240 stores this value, which is system 200's guaranteed minimum performance boost, in performance store 250. As a result, a manufacturer may guarantee system 200 to operate at a minimum performance equal to the guaranteed minimum performance boost for the benchmark under test (see FIG. 5 and corresponding text for further details).

Figure 3:
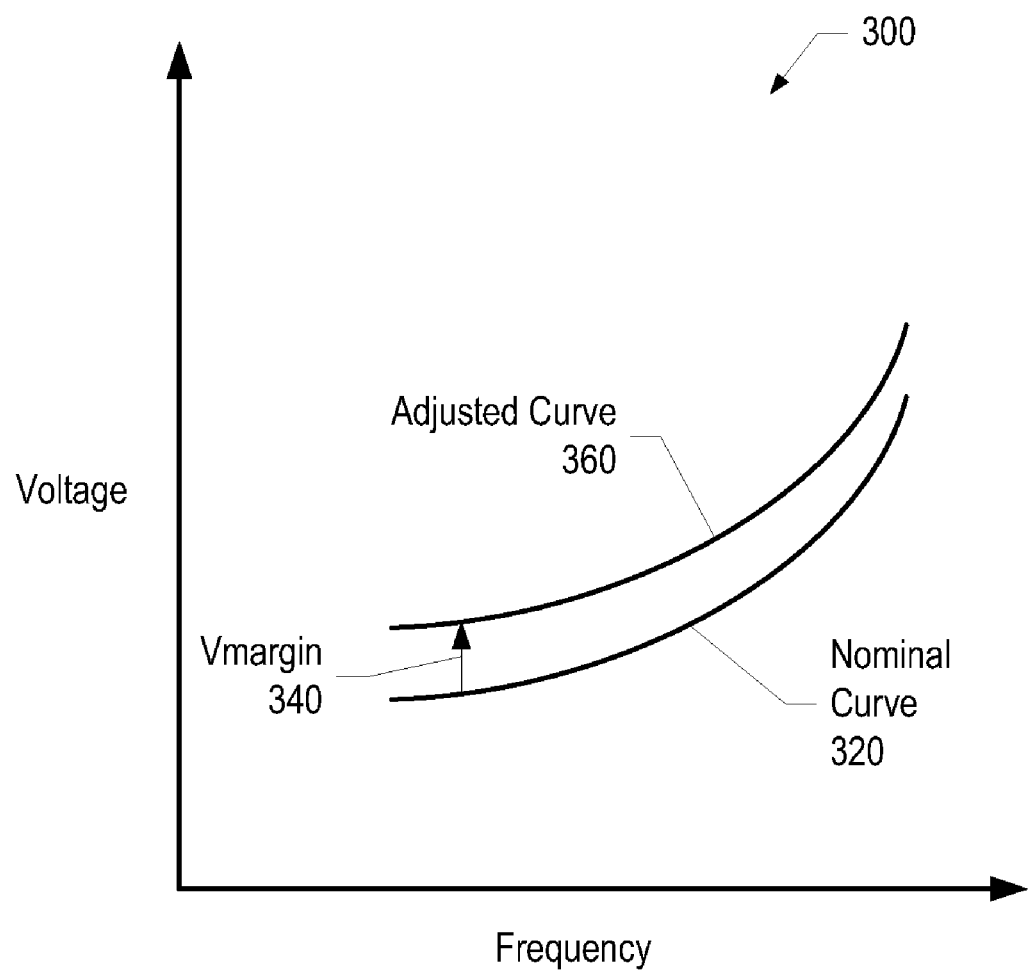
FIG. 3 is a graphical representation of adding a voltage margin to a device's nominal voltage versus frequency curve.

FIG. 3 is a graphical representation of adding a voltage margin to a device's nominal voltage versus frequency curve. Graph 300 includes nominal curve 320, which interpolates a compilation of voltage versus frequency plots that a device's manufacturing test obtains. Due to manufacturing process anomalies, each device may not have an identical nominal curve 320. A device may store nominal curve 320 values as vital product data or bios data, which a thermal power management device utilizes to provide proper voltages at particular frequencies.

Voltage margin 340 represents a computed or measured voltage value to add to the device's nominal voltage under worst-case power workload conditions and a particular frequency, which causes the device to reach the device's power limit. As can be seen, adding voltage margin 340 to nominal curve 320 produces a new adjusted curve 360. During benchmark testing, the thermal power management device utilizes points along adjusted curve 360 while monitoring the device's power in order to identify a system's guaranteed minimum performance boost (see FIGS. 2, 7, and corresponding text for further details).

Figure 4:
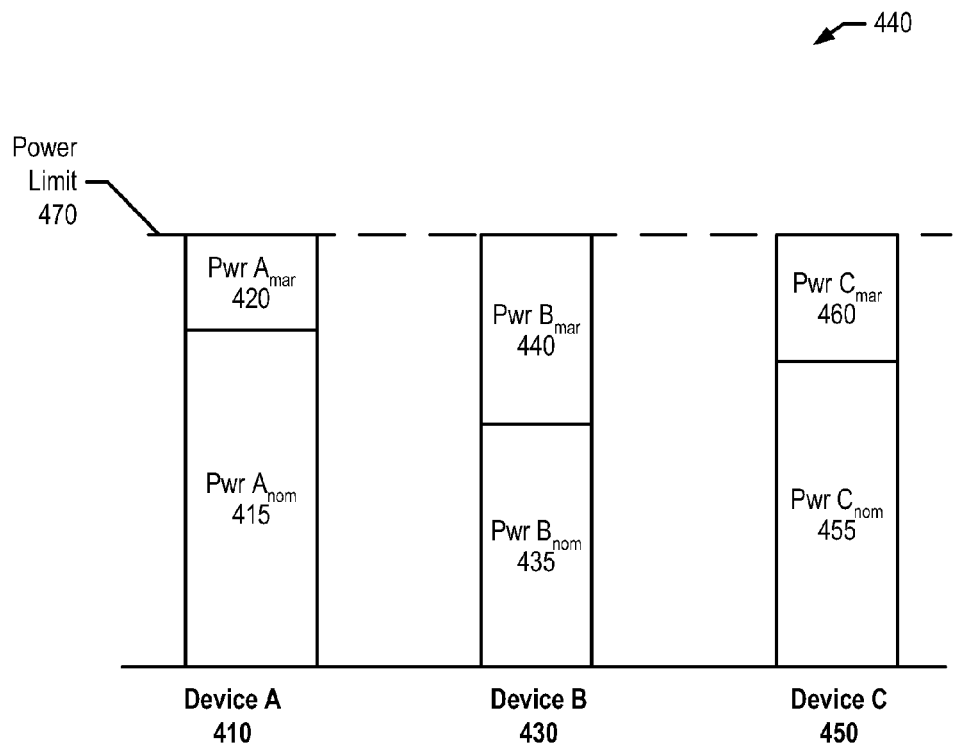
FIG. 4 is a graphical representation showing different devices utilizing different voltage margin values in order to reach a power limit at particular frequency and workload conditions.

FIG. 4 is a graphical representation showing different devices utilizing different voltage margin values in order to reach a power limit at particular frequency and workload conditions. Based upon manufacturing process anomalies, similar device types may require different nominal voltages for optimum functionality. This, in turn, results in the different devices producing different power levels at a particular frequency and workload.

FIG. 4 shows device A 410, B 430, and C 450 power outputs under their respective nominal voltages. When device A 410 operates at its nominal voltage, it produces power $A_{nom}$ 415. When device B 430 operates at its nominal voltage, it produces power $B_{nom}$ 435. And, when device C 450 operates at its nominal voltage, in produces power $C_{nom}$ 455.

In one embodiment, manufacturing computes voltage margins for each device that results in each device operating at power limit 470. As can be seen, when device A 410 operates at a voltage level that is the sum of its nominal voltage and voltage margin, device A 410 produces power that is the sum of power $A_{nom}$ 415 plus power $A_{mar}$ 420. Likewise, when device B 430 operates at a voltage level that is the sum of its nominal voltage and voltage margin, device B 430 produces power that is the sum of power $B_{nom}$ 435 plus power $B_{mar}$ 440. And, when device C 450 operates at a voltage level that is the sum of its nominal voltage and voltage margin, device C 450 produces power that is the sum of power $C_{nom}$ 455 plus power $C_{mar}$ 460. As can be seen, since each device produces different power levels at their respective nominal voltage, each device requires a different voltage margin, which produces a different amount of additional power, in order to reach power limit 470.

Figure 5:
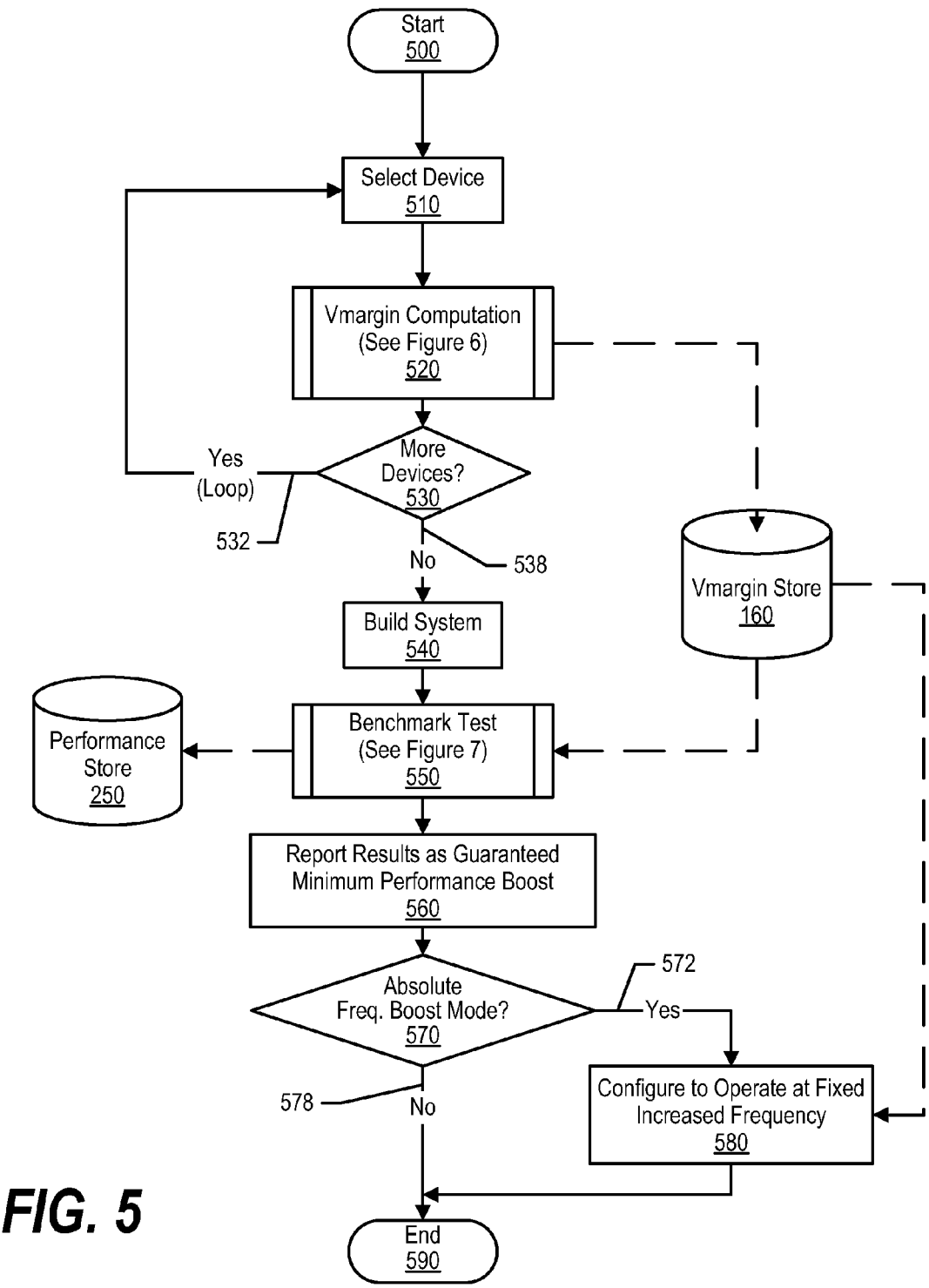
FIG. 5 is a high-level flowchart showing steps taken in identifying a system's guaranteed minimum frequency increase.

FIG. 5 is a high-level flowchart showing steps taken in identifying a system's guaranteed minimum performance boost capability. Processing commences at 500, whereupon processing selects a device (e.g., processor) at step 510. Processing proceeds through a series of steps to compute a voltage margin for the device during manufacturing test (predefined process block 520, see FIG. 6 and corresponding text for further details). In one embodiment, processing identifies the voltage margin by incrementally increasing the device's supply voltage until the device operates at a power limit (see FIG. 8 and corresponding text for further details).

Once processing computes the voltage margin, processing determines whether there are more devices in which to test (decision 530). If there are more devices in which to test, decision 530 branches to "Yes" branch 532, which loops back to select and process another device. This looping continues until there are no more devices to test, at which point decision 530 branches to "No" branch 538.

At step 540, processing builds a system using one or more of the tested devices. The system may include multiple devices and may also include a thermal power management device that manages each device's voltage, frequencies, and power limits (see FIG. 2 and corresponding text for further details). Once built, processing proceeds through a series of steps to benchmark test the system. During benchmark test, processing dynamically changes device frequencies and input voltages while maintaining each device's power levels (pre-defined process block 550, see FIG. 7 and corresponding text for further details). Processing, at step 560, reports the benchmark test results as a guaranteed minimum performance boost. For example, the guaranteed minimum performance boost may be a benchmark completion time value or a transactions per second value.

Processing determines whether to configure the system for an absolute frequency boost mode (decision 570). This configuration sets and maintains the device frequency to a highest value reached by the device frequency during the benchmark testing. For example, if the highest frequency reached during benchmark testing was 4.12 GHz, processing configures the system, which includes each of the devices, to operate exactly at 4.12 GHz when a user invokes the absolute frequency boost mode.

If processing should configure the system for an absolute frequency boost mode configuration, decision 570 branches to "Yes" branch 572 whereupon processing configures the system to operate at a fixed increased frequency when a user places the system in boost mode (step 580).

On the other hand, if processing should not configure the system for the absolute frequency boost mode, decision 570 branches to "No" branch 578, bypassing configuration step 580, and processing ends at 590.

FIG. 6 is a flowchart showing steps taken in an embodiment for computing a voltage margin for a device. Device test processing commences at 600, whereupon processing initiates the device at step 610. At step 620, processing acquires a minimum voltage, which is when circuit timings fail within the device while operating at a nominal frequency plus a frequency guard band. Processing, at step 630 acquires a maximum voltage, which is when the device produces an amount of power that reaches the device's rated power limit while executing a worst-case power workload condition at the nominal frequency.

Once processing acquires the minimum voltage and maximum voltage, processing computes a nominal voltage by dividing by two the sum of the minimum voltage and the maximum voltage (step 640). Next, processing computes a voltage margin by subtracting the nominal voltage from the maximum voltage (step 650). At step 660, processing stores the voltage margin for the device in voltage margin store 160, and processing returns at 670.

Figure 7:
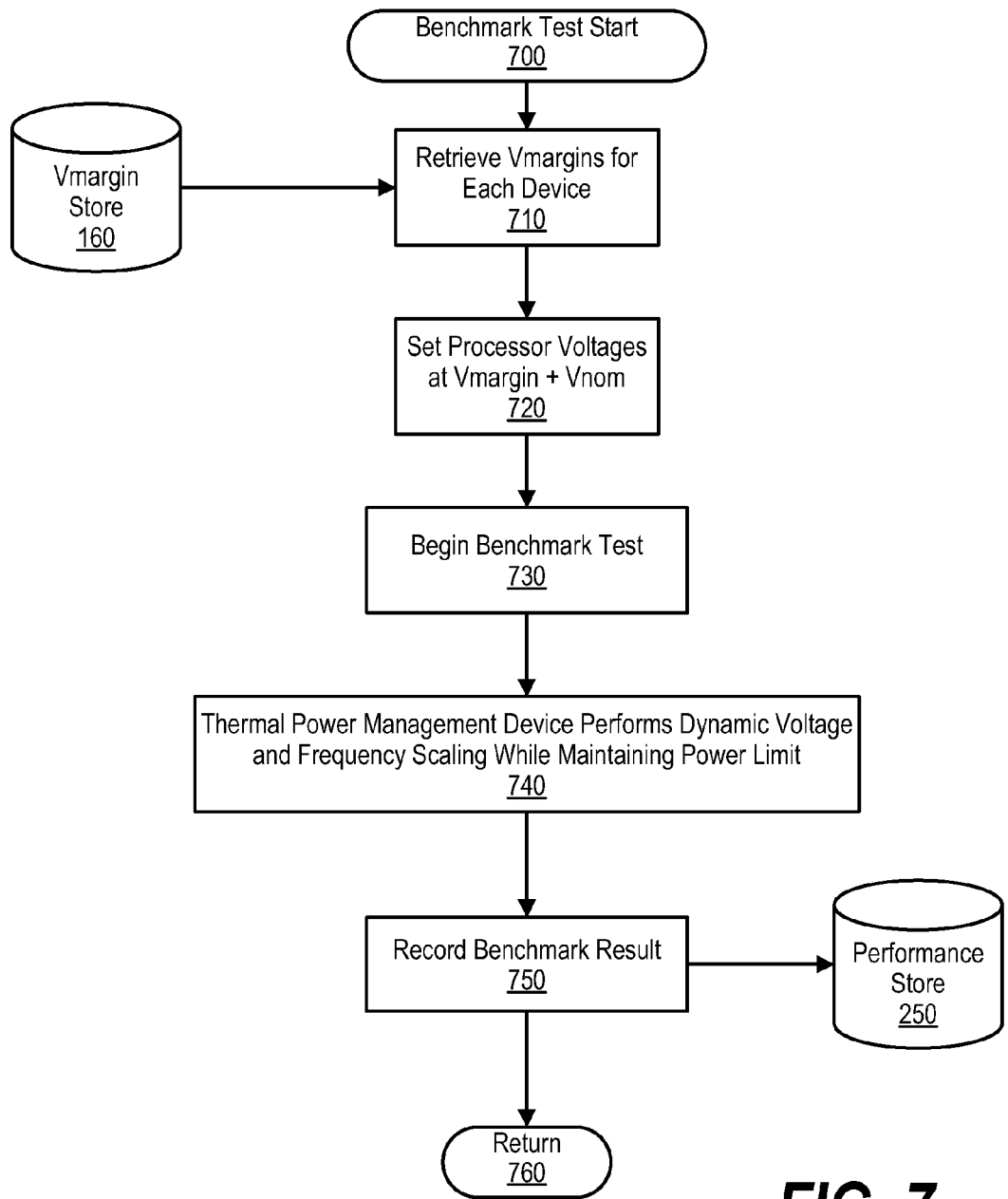
FIG. 7 is a flowchart showing steps taken in benchmarking a system that includes one or more devices in order to determine the system's guaranteed minimum performance boost capability.

FIG. 7 is a flowchart showing steps taken in benchmarking a system that includes one or more devices in order to determine the system's guaranteed minimum performance boost capability. Benchmark test processing commences at 700, whereupon processing retrieves voltage margins for each device the system includes. For example, if the system includes two devices, processing retrieves two different voltage margins.

At step 720, processing sets each device's supply voltage to their maximum power-managed voltage by adding their respective voltage margins to their respective nominal voltages. For example, device "A" may have a nominal voltage of 1.2 volts and a voltage margin of 0.3 volts and device "B" may have a nominal voltage of 1.4 volts and a voltage margin of 0.4 volts. In this example, processing sets device A's input voltage to 1.5 volts (1.2+0.3) and sets device B's input voltage to 1.8 volts (1.4+0.4).

Processing begins benchmark testing at step 730. During the benchmark test, processing (e.g., utilizing a thermal power management device (TPMD)) dynamically scales device voltages and frequencies while maintaining power limits of each device during step 740. Once the benchmark test completes, processing records the test performance in performance store 250, which includes the frequency at which one or more of the devices reached their power limit (step 750). Processing returns at 760.

Figure 8:
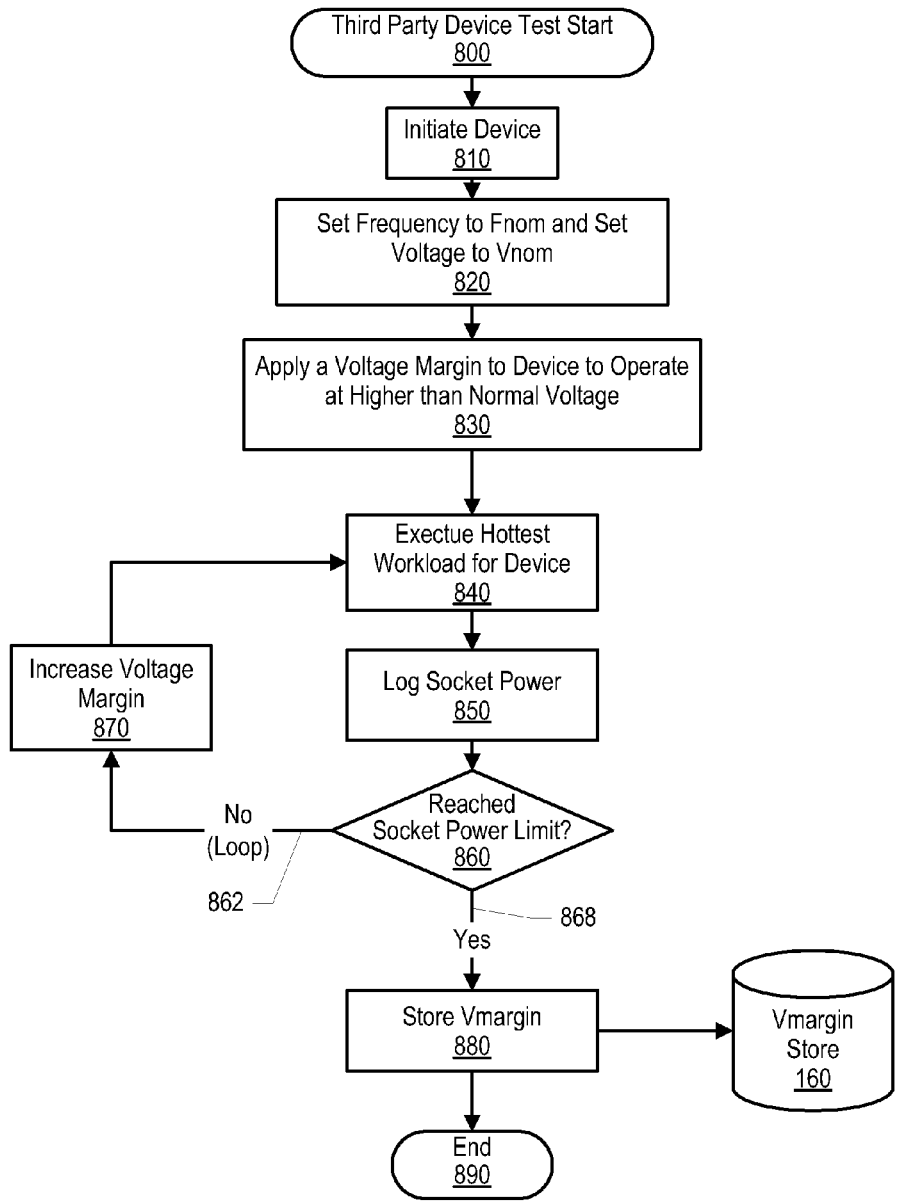
FIG. 8 is a flowchart showing steps taken in acquiring voltage margins for devices without manufacturing test information.

FIG. 8 is a flowchart showing steps taken in acquiring voltage margins for devices without voltage margin information from manufacturing test. Tester processing commences at 800, whereupon processing initiates the device at step 810. At step 820, processing sets a device frequency to a nominal frequency and sets a device voltage to a nominal voltage. As one skilled in the art can appreciate, a user may obtain these values from data sheets or general public information.

Processing applies a voltage margin to the nominal voltage that causes the device to operate at a higher voltage (step 830). Processing performs this step in order to identify a voltage at which the device operates at the device's power limit (see below). At step 840, processing executes a worst-case power workload test on the device and, at step 850, processing logs the device's socket power dissipation.

Processing determines whether the socket power reaches the device's power limit (decision 860). If the socket power has not reached the device's power limit, decision 860 branches to "No" branch 862, which loops back to increase the voltage margin (step 870) and re-execute the worst-case power workload. This looping continues until the socket power reaches the power limit, at which point decision 860 branches to "Yes" branch 868.

Processing stores the voltage margin value in voltage margin store 160 that resulted in the device reaching the power limit (step 880), and processing ends at 890. The device is now ready for insertion into a system for benchmark testing (see FIG. 7 and corresponding text for further details).

One of the preferred implementations of the invention is a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
retrieving a voltage margin at a benchmark tester that corresponds to a device included in a system, wherein the voltage margin indicates an additional amount of voltage to apply to a nominal voltage that, when added, results in the device operating at a power limit while executing a worst-case power workload;
setting an input voltage for the device to a value equal to the sum of the voltage margin and the nominal voltage;
in response to setting the input voltage, dynamically benchmark testing the system using the benchmark tester, which includes adjusting a device frequency supplied to the device and the input voltage while ensuring that the device does not exceed the power limit; and
in response to benchmark testing the system utilizing the input voltage that is equal to the sum of the voltage margin and the nominal voltage, recording a guaranteed minimum performance boost for the system at the benchmark tester based upon a result of the benchmark testing.

2. The method of claim 1 further comprising:
acquiring a minimum voltage for the device while setting the device frequency equal to the sum of a nominal frequency plus a frequency guard band;
acquiring a maximum voltage for the device at the nominal frequency;
computing the nominal voltage by dividing by two the sum of the minimum voltage plus the maximum voltage;
computing the voltage margin by subtracting the nominal voltage from the maximum voltage; and
storing the voltage margin.

3. The method of claim 1 further comprising:
setting the device frequency to a nominal frequency and setting the input voltage to the nominal voltage;
incrementally increasing the input voltage until the device operates at the power limit while executing the worst-case power workload;
computing the voltage margin by determining the incremented voltage over the nominal voltage that caused the device to operate at the power limit; and
storing the voltage margin.

4. The method of claim 1 further comprising:
configuring the device to an absolute frequency boost mode by setting and maintaining the device frequency to a highest value reached by the device frequency during the benchmark testing.

5. The method of claim 1 wherein the guaranteed minimum performance boost is a value that is selected from the group consisting of a benchmark completion time value and a number of transactions per second value.

6. The method of claim 1 wherein the system includes the device and a different device, the method further comprising:
retrieving a different voltage margin at the benchmark tester that corresponds to the different device, wherein the different voltage margin indicates a different additional amount of voltage to apply to a different nominal voltage that, when added, results in the different device operating at the power limit while executing the worst-case power workload;
setting a different input voltage for the different device to a different value equal to the sum of the different voltage margin and the different nominal voltage;
in response to setting the different input voltage, dynamically benchmark testing the system that includes the device and the different device using the benchmark tester, which includes adjusting the device frequency supplied to the device and the different device, and adjusting the input voltage and the different input voltage until the device or the different device operates at the power limit; and
recording the system guaranteed minimum performance boost based upon benchmark testing the system that includes the device and the different device.

7. The method of claim 1 wherein a thermal power management device performs the adjustment of the device frequency and the input voltage while monitoring a power output from the device.

8. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
retrieving a voltage margin from the nonvolatile storage area that corresponds to a device included in a computer system, wherein the voltage margin indicates an additional amount of voltage to apply to a nominal voltage that, when added, results in the device operating at a power limit while executing a worst-case power workload;
setting an input voltage for the device to a value equal to the sum of
in response to setting the input voltage, dynamically benchmark testing the computer system, which includes adjusting a device frequency supplied to the device and the input voltage while ensuring that the device does not exceed the power limit; and
in response to benchmark testing the computer system utilizing the input voltage that is equal to the sum of the voltage margin and the nominal voltage, recording a guaranteed minimum performance boost for the computer system based upon a result of the benchmark testing.

9. The information handling system of claim 8 wherein the set of instructions performs actions of:
acquiring a minimum voltage for the device while setting the device frequency equal to the sum of a nominal frequency plus a frequency guard band;
acquiring a maximum voltage for the device at the nominal frequency;
computing the nominal voltage by dividing by two the sum of the minimum voltage plus the maximum voltage;
computing the voltage margin by subtracting the nominal voltage from the maximum voltage; and
storing the voltage margin in the nonvolatile storage area.

10. The information handling system of claim 8 wherein the set of instructions performs actions of:

setting the device frequency to a nominal frequency and setting the input voltage to the nominal voltage;

incrementally increasing the input voltage until the device operates at the computing the voltage margin by determining the incremented voltage over the nominal voltage that caused the device to operate at the power limit; and storing the voltage margin in the nonvolatile storage area.

11. The information handling system of claim 8 wherein the set of instructions performs actions of:

configuring the device to an absolute frequency boost mode by setting and maintaining the device frequency to a highest value reached by the device frequency during the benchmark testing.

12. The information handling system of claim 8 wherein the guaranteed minimum performance boost is a value that is selected from the group consisting of a benchmark completion time value and a number of transactions per second value.

13. The information handling system of claim 8 wherein the computer system includes the device and a different device, the set of instructions performing actions of:

retrieving a different voltage margin from the nonvolatile storage area that corresponds to the different device, wherein the different voltage margin indicates a different additional amount of voltage to apply to a different nominal voltage that, when added, results in the different device operating at the power limit while executing the worst-case power workload;

setting a different input voltage for the different device to a different value equal to the sum of the different voltage margin and the different nominal voltage;

in response to setting the different input voltage, dynamically benchmark testing the computer system that includes the device and the different device, which includes adjusting the device frequency supplied to the device and the different device, and adjusting the input voltage and the different input voltage until the device or the different device operates at the power limit; and recording the system guaranteed minimum performance boost based upon benchmark testing the system that includes the device and the different device.

14. The information handling system of claim 8 wherein a thermal power management device performs the adjustment of the device frequency and the input voltage while monitoring a power output from the device.

15. A computer program product stored in a computer readable medium, comprising functional descriptive material that, when executed by an information handling system, causes the information handling system to perform actions that include:

retrieving a voltage margin that corresponds to a device included in a system, wherein the voltage margin indicates an additional amount of voltage to apply to a nominal voltage that, when added, results in the device operating at a power limit while executing a worst-case power workload;

setting an input voltage for the device to a value equal to the sum of the voltage margin and the nominal voltage;

in response to setting the input voltage, dynamically benchmark testing the system, which includes adjusting a device frequency supplied to the device and the input voltage while ensuring that the device does not exceed the power limit; and in response to benchmark testing the system utilizing the input voltage that is equal to the sum of the voltage margin and the nominal voltage, recording a guaranteed minimum performance boost for the system based upon a result of the benchmark testing.

16. The computer program product of claim 15 wherein the information handling system further performs actions that include:

acquiring a minimum voltage for the device while setting the device frequency equal to the sum of a nominal frequency plus a frequency guard band;

acquiring a maximum voltage for the device at the nominal frequency;

computing the nominal voltage by dividing by two the sum of the minimum voltage plus the maximum voltage;

computing the voltage margin by subtracting the nominal voltage from the maximum voltage; and storing the voltage margin.

17. The computer program product of claim 15 wherein the information handling system further performs actions that include:

setting the device frequency to a nominal frequency and setting the input voltage to the nominal voltage;

incrementally increasing the input voltage until the device operates at the power limit while executing the worst-case power workload;

computing the voltage margin by determining the incremented voltage over the nominal voltage that caused the device to operate at the power limit; and storing the voltage margin.

18. The computer program product of claim 15 wherein the information handling system further performs actions that include:

configuring the device to an absolute frequency boost mode by setting and maintaining the device frequency to a highest value reached by the device frequency during the benchmark testing.

19. The computer program product of claim 15 wherein the guaranteed minimum performance boost is a value that is selected from the group consisting of a benchmark completion time value and a number of transactions per second value.

20. The computer program product of claim 15 wherein the system includes the device and a different device, the information handling system further performing actions that include:

retrieving a different voltage margin that corresponds to the different device, wherein the different voltage margin indicates a different additional amount of voltage to apply to a different nominal voltage that, when added, results in the different device operating at the power limit while executing the worst-case power workload;

setting a different input voltage for the different device to a different value equal to the sum of the different voltage margin and the different nominal voltage;

in response to setting the different input voltage, dynamically benchmark testing the system that includes the device and the different device, which includes adjusting the device frequency supplied to the device and the different device, and adjusting the input voltage and the different input voltage until the device or the different device operates at the power limit; and recording the system guaranteed minimum performance boost based upon benchmark testing the system that includes the device and the different device.

21. An information handling system comprising:
one or more processors;
a memory accessible by at least one of the processors;
a nonvolatile storage area accessible by at least one of the processors;

means for retrieving a voltage margin from the nonvolatile storage area that corresponds to a device included in a computer system, wherein the voltage margin indicates an additional amount of voltage to apply to a nominal voltage that, when added, results in the device operating at a power limit while executing a worst-case power workload;

means for setting an input voltage for the device to a value equal to the sum of the voltage margin and the nominal voltage;

means for dynamically benchmark testing the computer system, which includes adjusting a device frequency supplied to the device and the input voltage while ensuring that the device does not exceed the power limit in response to setting the input voltage; and means for recording a guaranteed minimum performance boost for the computer system based upon a result of the benchmark testing in response to benchmark testing the computer system utilizing the input voltage that is equal to the sum of the voltage margin and the nominal voltage.

\* \* \* \* \*